3,257,399
PREPARATION OF CYANURIC CHLORIDE
Yutaka Kodama, Toshisuke Sasakura, Saburo Takata, Masaru Shinjo, Yoshitomo Noguchi, and Hiroaki Tamura, Toyama-shi, Japan, assignors to Toyama Kagaku Kogyo Kabushiki Kaisha, Tokyo, Japan, a corporation of Japan
No Drawing. Filed Dec. 27, 1962, Ser. No. 247,518
Claims priority, application Japan, Jan. 5, 1962, 37/87; July 2, 1962, 37/27,151
4 Claims. (Cl. 260—248)

This invention relates to a process for preparing cyanuric chloride. More particularly, it relates to the production of cyanuric chloride which process may either be to react hydrogen cyanide with chlorine directly in the presence of a catalyst or to polymerize cyanogen chloride.

There are two commercial methods for the production of cyanuric chloride, one is a method in which hydrogen cyanide is reacted with chlorine to directly form cyanuric chloride, and on the other hydrogen cyanide is reacted with chlorine to form cyanogen chloride and the cyanogen chloride formed is polymerized to produce cyanuric chloride. For the polymerization, gas-phase polymerization is carried in the presence of catalysts of active carbon, chlorides of metals of Group II of the Mendeleev chart, chlorides of alkali metals or chlorides of copper, lead or manganese.

However, these catalysts are not satisfactory, for there are many difficulties in keeping moisture content constant and regeneration of activity.

It is an object of the present invention to provide a new catalyst useful for cyanuric chloride manufacture, which is composed of a binary or ternary equilibrium composition at 200°–500° C. of aluminum chloride and/or ferric chloride and halides of metals selected from Group I or II of the Mendeleev chart.

It is another object of the present invention to provide a catalyst having an excellent and reproducible activity and which is suitable for the industrial production of cyanuric chloride.

It is a further object of the present invention to provide a method for producing cyanuric chloride by passing hydrogen cyanide and chlorine or cyanogen chloride over the polymerization catalyst which is in the form of fixed bed or fluidized bed, said catalyst being composed of a binary or ternary equilibrium composition at 200°–500° C. of aluminum chloride and/or ferric chloride and halides of metals selected from Group I or II of the Mendeleev chart.

The equilibrium composition in the present specification includes compositions covering (1) $AlCl_3$ and halides of metals of Group I or II,
(2) $FeCl_3$ and halides of metals of Group I or II, and
(3) $AlCl_3$, $FeCl_3$ and halides of metals of Group I or II.

The equilibrium composition in the specification means the final products produced from a treatment wherein aluminum chloride and/or ferric chloride and halides of metals of Group I or II of the Mendeleev chart are mixed and the mixture is heated at 200°–500° C. until an equilibrium is reached. The temperature is varied within the range according to the reaction temperature of the present process. The composition may be formed in a reaction vessel where hydrogen cyanide and chlorine, or cyanogen chlorine is passed through. In the latter case, the mixture of aluminum chloride and/or ferric chloride and halides of metals of Group I or II are placed in the reaction vessel kept at 200°–500° C. which is the reaction temperature of the present process, and the catalyst composition is formed in situ. The halides of metals of Group I or II includes sodium chloride, potassium chloride, calcium chloride, barium chloride and strontium chloride. The ratio of the components in the final composition may be different from that before heating. There is no critical limitation on the ratio of mixing components.

Neither aluminum chloride nor ferric chloride have been considered to be suitable for polymerization catalysts for producing cyanuric chloride, because their sublimation temperatures are lower than the polymerization temperature for producing cyanuric chloride.

Such defect can be overcome by compounding them with halides of metals selected from Group I or II, according to the present invention. This composition does not lose catalytic activity for a long period of time at the reaction temperature of the present process. On the other hand, the conventional catalysts are defective in that their activities are influenced by either the method of activation such as in the case of active carbon or by the degree of dehydration as in the case of metal halides which are hygroscopic. The present catalyst composition is hygroscopic, but, moisture absorbed is readily decomposed off by heating the catalyst at the reaction temperature, thereby no reduction of catalytic activity is seen. The ternary composition composed of aluminum chloride, ferric chloride and halides of metals of Group I or II is more desirable than the binary composition from the standpoints of activity and life.

The complex salts of the present invention may be used in the form carried on porous carriers such as, for example, active carbon, coke, diatomaceous earth and silica gel.

Cyanuric chloride of high purity is produced from a gaseous mixture of hydrogen cyanide and chlorine or from cyanogen chloride by passing the gas over the catalyst of the present equilibrium composition, at a temperature of 200°–500° C. The catalyst may be used in the form of a fixed bed or fluidized bed type. Conversion rate and yield are remarkably high, although they depend on space velocities of feed. No unreacted material is produced at space velocity of 200–250 l./l./hr. in case of fixed-bed type polymerization of cyanogen chloride or at space velocity of 150–180 l./l./hr. in case of fixed-bed type polymerization of hydrogen cyanide and chlorine.

*Example 1*

In a quartz tube having a diameter of 30 mm. and laid horizontally disposed, 250 cc. of a catalyst, composed of an equilibrium composition adsorbed on a silica gel carrier in an amount of 10 percent of the carrier, were placed. The equilibrium composition consisted of 70 percent by weight of aluminum chloride and 30 percent by weight of sodium chloride. After the catalyst had been once heated to 450° C., cyanogen chloride was passed through the tube at a speed of 50 l./hr. and a temperature of 380° C. for 3 hours. 405 g. of cyanuric chloride having purity of 99 percent was obtained. Space velocity of the feed gas equalled to 200 l./l./hr. and the yield was 98 percent.

*Example 2*

In the same reaction tube employed in Example 1, 250 cc. of a catalyst composed of an equilibrium composition of 76 percent by weight of aluminum chloride and 24 percent by weight of sodium fluoride, adsorbed on a silica gel carrier in an amount of 20 percent of the carrier were placed. After the catalyst had been once heated to 450° C., cyanogen chloride was passed through the tube at a speed of 50 l./hr. for 3 hours. 394 g. of cyanuric chloride of 99 percent purity was obtained. The yield was 96 percent.

Example 3

In the same reaction tube as employed in Example 1 250 cc. of a catalyst composed of an equilibrium composition of 72 percent by weight of ferric chloride and 28 percent by weight of sodium chloride, adsorbed on a silica gel carrier in an amount of 20 percent of the carrier were placed. After the carrier had been once heated to 450° C., cyanogen chloride was passed through the tube at a flow rate of 50 l./hr. and a temperature of 380° C. for 3 hours. 385 g. of cyanuric chloride having purity of 99 percent were obtained. Space velocity of the feed gas equalled to 200 l./l./hr. and the yield was 93 percent.

Example 4

In the same reaction tube as employed in Example 1. 250 cc. of a catalyst composed of a ternary equilibrium composition of 60 percent by weight of aluminum chloride 30 percent of sodium chloride and 10 percent of ferric chloride, adsorbed on a silica gel carrier in an amount of 20 percent of the carrier were placed. After the catalyst had been once heated to 450° C., cyanogen chloride was passed through the tube at a flow rate of 62.5 l./hr. and a temperature of 380° C. for 3 hours. 504 g. of cyanuric chloride having having purity of 99 percent were obtained. Space velocity of the feed gas equalled to 250 l./l./hr. and the yield was 98 percent.

Example 5

In the same reaction tube as employed in Example 1 250 cc. of a catalyst composed of a ternary equilibrium composition of 61 percent by weight of aluminum chloride, 34 percent of potassium chloride and 5 percent of cupric chloride, adsorbed on a silica gel carrier in an amount of 20 percent of the carrier were placed. After the catalyst had been once heated to 450° C., a gaseous mixture of hydrogen cyanide and chlorine was passed through the tube at a flow rate of 22 l./hr. for hydrogen cyanide and 23 l./hr. for chlorine at a reaction temperature of 420° C. 55.5 g./hr. on an average of cyanuric chloride was obtained. Space velocity of the gaseous mixture was 180 l./l./hr. and the yield was 92 percent.

After 150 hours of a continuous reaction, the yield was kept still not lower than 90 percent.

Example 6

In the same reaction tube as employed in Example 1 250 cc. of a catalyst composed of an equilibrium composition of 55 percent by weight of aluminum chloride and 45 percent by weight of calcium chloride, adsorbed on an active carbon carrier were placed. After the catalyst was heated to 450° C. a gaseous mixture of hydrogen cyanide and chloride was passed through the tube at a flow rate of 19 l./hr. for hydrogen cyanide and 20 l./hr. for chlorine at a reaction temperature of 420° C. 46.5 g. on an average of the product was obtained, namely the yield was 90 percent.

What is claimed is:

1. In a process for preparing cyanuric chloride by passing a member selected from the group consisting of cyanogen chloride and a mixture of hydrogen cyanide and chlorine over a catalyst, the improvement comprising the catalyst being an equilibrium composition at a temperature of 200°–500° C. of at least one halide selected from the group consisting of alkali metal halides and alkaline earth metal halides and at least one halide selected from the group consisting of aluminum chloride and ferric chloride.

2. A process according to claim 1 wherein the equilibrium composition consists of $AlCl_3$ and a member selected from the group consisting of sodium chloride, potassium chloride, calcium chloride, barium chloride and strontium chloride.

3. A process according to claim 1 wherein the equilibrium composition consists of $FeCl_3$ and a member selected from the group consisting of sodium chloride, potassium chloride, calcium chloride, barium chloride and strontium chloride.

4. A process according to claim 1 wherein the equilibrium composition consists of $AlCl_3$, $FeCl_3$ and a member selected from the group consisting of sodium chloride, potassium chloride, calcium chloride, barium chloride and strontium chloride.

References Cited by the Examiner
UNITED STATES PATENTS 1,989,042  1/1935  Kunz et al. _____ 260—248

FOREIGN PATENTS 126,276  12/1947  Australia.
812,250  8/1951  Germany.
718,806  11/1954  Great Britain.

OTHER REFERENCES

German auslegeschrift 1,098,518, February 1961.
Germany auslegeschrift 1,109,697, June 1961.

JOHN M. FORD, *Assistant Examiner.*

WALTER A. MODANCE, *Primary Examiner.*